(12) United States Patent
Zhou et al.

(10) Patent No.: US 11,757,087 B2
(45) Date of Patent: Sep. 12, 2023

(54) LITHIUM ION BATTERY ELECTRODE

(71) Applicant: UNIVERSITY OF SOUTH CAROLINA, Columbia, SC (US)

(72) Inventors: Xiao-Dong Zhou, Irmo, SC (US); Kuber Mishra, Columbia, SC (US); Fu-Sheng Ke, Wuhan (CN)

(73) Assignee: University of South Carolina, Columbia, SC (US)

( * ) Notice: Subject to any disclaimer, the term of this patent is extended or adjusted under 35 U.S.C. 154(b) by 29 days.

(21) Appl. No.: 17/166,076

(22) Filed: Feb. 3, 2021

(65) Prior Publication Data

US 2021/0184203 A1 Jun. 17, 2021

Related U.S. Application Data

(62) Division of application No. 14/635,212, filed on Mar. 2, 2015, now Pat. No. 10,944,101.

(Continued)

(51) Int. Cl.
H01M 4/1395 (2010.01)
H01M 4/38 (2006.01)
H01M 4/134 (2010.01)
H01M 4/62 (2006.01)
H01M 4/02 (2006.01)
B82Y 30/00 (2011.01)

(52) U.S. Cl.
CPC ......... H01M 4/1395 (2013.01); H01M 4/134 (2013.01); H01M 4/38 (2013.01); H01M 4/622 (2013.01); B82Y 30/00 (2013.01); H01M 4/625 (2013.01); H01M 2004/021 (2013.01)

(58) Field of Classification Search
CPC ...... H01M 4/1395; H01M 4/134; H01M 4/38; H01M 4/622; H01M 4/625; H01M 2004/021; B82Y 30/00; Y02E 60/10
See application file for complete search history.

(56) References Cited

U.S. PATENT DOCUMENTS 2,728,786 A 12/1955 McGrath et al.
2,837,591 A * 6/1958 Rhyne, Jr. ............... H01M 4/38
429/206

(Continued)

FOREIGN PATENT DOCUMENTS

CN 103247803 * 8/2013 ............. B82Y 30/00
JP 2012-033371 * 2/2012 ............. H01M 4/38

OTHER PUBLICATIONS

CN 103247803 machine English translation (Year: 2013).*

(Continued)

Primary Examiner — Michael L Dignan
(74) Attorney, Agent, or Firm — Dority & Manning, P.A.

(57) ABSTRACT

Methods are provided for forming an electrode. The method can comprise thermally reducing $GeO_2$ powders at a reducing temperature of 300° C. to 600° C. to produce Ge particles; mixing the Ge particles with an organic binder and a carbon source; and pressing the Ge particles with the binder and the carbon source to form the electrode. Electrodes are also provided that include a plurality of microparticles comprising Ge grains, an organic binder, and a carbon source, wherein the Ge grains comprise cubic Ge and are bonded together to form Ge particles, and wherein the Ge grains define nanopores within the electrode.

14 Claims, 11 Drawing Sheets

Related U.S. Application Data

(60) Provisional application No. 61/966,742, filed on Feb. 28, 2014.

(56) References Cited

U.S. PATENT DOCUMENTS

| | | | |
|---|---|---|---|
| 2010/0190059 A1 | 7/2010 | Graetz et al. | |
| 2011/0052953 A1 | 3/2011 | Saito et al. | |
| 2012/0088155 A1* | 4/2012 | Yushin | H01M 4/134 |
| | | | 977/773 |
| 2012/0156562 A1 | 6/2012 | Kobayashi et al. | |

OTHER PUBLICATIONS

JP 2012-033371 machine English translation (Year: 2012).*
Cho et al. "Tetragonal Phase Germanium Nanocrystals in Lithium Ion Batteries." ACS Nano 2013, 7, 10, 9075-9084 (Year: 2013).*
Klavetter et al. "A high-rate germanium-particle slurry cast Li-ion anode with high Coulombic efficiency and long cycle life." Journal of Power Sources 238 (2013) 123-136 (Year: 2013).*
Cui et al. "A Germanium-Carbon Nanocomposite Material for Lithium Batteries." Adv. Mater. 2008, 20, 3079-3083. (Year: 2008).*
Applestone, et al. "$Cu_6Sn_5$-TiC—C nanocomposite alloy anodes with high volumetric capacity for lithium ion batteries" RSC Adv. 2 (2012) pp. 5411-5417.
Baggetto, et al. "Germanium as negative electrode material for sodium-ion batteries" Electrochem. Comm. 34 (2013) pp. 41-44.
Bielz, et al. "Reduction of Different $GeO_2$ Polymorphs" J. Phys. Chem. C 116 (2012) pp. 9961-9969. (Supporting Information only).
Chan, et al. "High-performance lithium battery anodes using silicon nanowires." Nat. Nanotech. 3 (2008) pp. 31-35.
Christensen, et al. "Effect of Anode Film Resistance on the Charge/Discharge Capacity of a Lithium-Ion Battery" J. Electrochem. Soc. 150 (2003) pp. A1416-A1420.
Dileo, et al. "Balanced approach to safety of high capacity silicon-germanium-carbon nanotube free-standing lithium ion battery anodes" Nano Ener. 2 (2013) pp. 268-275.
Hasegawa, et al. "Hydrogen Reduction of Germanium Dioxide" J. Jap. Inst. Metals 13 (1972) pp. 39-44.
Holzapfel, et al. "A new type of nano-sized silicon/carbon composite electrode for reversible lithium insertion" Chem. Comm. (2005) pp. 1566-1568.
Jo, et al. "Binder-free Ge nanoparticles-carbon hybrids for anode materials of advanced lithium batteries with high capacity and rate capability" Chem. Comm. 48 (2012) pp. 3987-3989.
Ke, et al. "Tailoring nanostructures in micrometer size germanium particles to improve their performance as an anode for lithium ion batteries" Chem. Comm. 50 (2014) pp. 3713-3715.
Ke, et al. "Nanoscale tin-based intermetallic electrodes encapsulated in microporous copper substrate as the negative electrode with a high rate capacity and a long cycleability for lithium-ion batteries" Nano Ener. 2 (2013) pp. 595-603.
Ke, et al. "Three-dimensional nanoarchitecture of Sn—Sb—Co alloy as an anode of lithium-ion batteries with excellent lithium storage performance" J. Mater. Chem. 22 (2012) pp. 17511-17517.
Klavetter, et al. "A high-rate germanium-particle slurry cast Li-ion anode with high Coulombic efficiency and long cycle life." J. Pow. Sources 238 (2013) 123-136.
Kovalenko, et al. "A Major Constituent of Brown Algae for use in High-Capacity Li-Ion Batteries" Science 334 (2011) pp. 75-79.
Liang, et al. "Tough Germanium Nanoparticles under Electrochemical Cycling" ACS Nano 7 (2013) pp. 3427-3433.
Lin, et al. "High performance silicon nanoparticle anode in fluoroethylene carbonate-based electrolyte for Li-ion batteries" Chem. Comm. 48 (2012) pp. 7268-7270.
Liu, et al. "3D ordered macroporous germanium fabricated by electrodeposition from an ionic liquid and its lithium storage properties" J. Mater. Chem. A 1 (2013) pp. 15076-15081.
Liu, et al. "Tailoring Lithiation Behavior by Interface and Bandgap Engineering at the Nanoscale" Nano Lett. 13 (2013) pp. 4876-4883.
Liu, et al. "Dense core-shell structure $SnO_2$/C composite as high performance anodes for lithium ion batteries" Chem. Comm. 46 (2010) pp. 1437-1439.
Müller, et al. "Further Studies on the Preparation of Metallic Germanium and the Volatility of the Metal in Hydrogen and in Vacuo" Proc. Am. Philos. Soc. 65 (1926) pp. 15-32.
Nam, et al. "Electrochemical performances of Sn anode electrodeposited on porous Cu foam for Li-ion batteries." Electrochimica Acta 66 (2012) pp. 126-132.
Seng, et al. "Catalytic role of Ge in highly reversible $CeO_2$/Ge/C nanocomposite anode material for lithium batteries" Nano Lett. 13 (2013) pp. 1230-1236.
Seo, et al. "High performance Ge nanowire anode sheathed with carbon for lithium rechargeable batteries" Ener. Envir. Sci. 4 (2011) pp. 425-428.
Smith, et al. "High-Precision Differential Capacity Analysis of $LiMn_2O_4$/graphite Cells" Electrochem. Sol. State Lett. 14 (2011) pp. A39-A41.
Taylor, et al. "Reduction of Metal Oxides by Hydrogen" J. Am. Chem. Soc. 52 (1930) pp. 2314-2325.
Yoon, et al. "Electrochemical Characterizations of Germanium and Carbon-Coated Germanium Composite Anode for Lithium-Ion Batteries" Electrochem. Sol. State Lett. 11 (2008) pp. A42-A45.
Zhao, et al. "Hierarchical micro/nano porous silicon Li-ion battery anodes" Chem. Comm. 48 (2012) pp. 5079-5081.

* cited by examiner

LITHIUM ION BATTERY ELECTRODE

CROSS REFERENCE TO RELATED APPLICATION

The present application is a Divisional Application of U.S. patent application Ser. No. 14/635,212, titled "Superior Lithium Ion Battery Electrode and Methods for Fabricating Such," of Zhou, et al. filed on Mar. 2, 2015, which claims priority to U.S. Provisional Patent Application Ser. No. 61/966,742, titled "Superior Lithium Ion Battery Electrode and Methods for Fabricating Such" of Zhou, et al. filed on Feb. 28, 2014, the disclosures of which are incorporated by reference herein.

STATEMENT REGARDING FEDERALLY SPONSORED RESEARCH OR DEVELOPMENT

This invention was made with government support under DMR-1006113 awarded by the National Science Foundation. The government has certain rights in the invention.

BACKGROUND

The next generation electric vehicles necessitate the development of lithium batteries with high-energy and high-power density. Generally, the power density of a lithium ion battery is limited by its negative electrode. The current primary choice of the anode material is graphite due to its cost effectiveness, but graphite exhibits a low energy density (about 372 mAh/g) and poor rate-performance for future electric vehicles. As a consequence, high performance negative electrode materials, in particular Si (about 4200 mAh/g) and Sn (about 994 mAh/g), have been extensively explored because of their superior electrochemical properties, such as high capacity, moderate potential vs. Li/Li$^+$, low cost, and environmental benignancy. The primary challenge to achieving stable performance of Si- or Sn-based anodes originates from the large volume change (260% for Sn and 340% for Si) occurring during insertion/extraction processes of lithium ions. The repeated expansion/contraction results in the pulverization of anode particles, leading to the loss of electric contact between anode particles and the current collector.

To mitigate the detrimental effects of volume changes, several approaches have been reported, including the utilization of a matrix (like carbon or graphene) into the active anode materials to form Sn composites, the synthesis of intermetallic compounds that can buffer volume fluctuation, and the design of unique nanoarchitecturing morphology of the Si- or Sn-based electrodes. Germanium (about 1620 mAh/g) has gained attention during the past few years for its nearly isotropic lithiation, which results in weak anisotropy of the lithiation strain as shown from a recent in-situ TEM study. In addition, Ge exhibits higher electronic conductivity and Li diffusivity than Si, which potentially enables a high-rate performance of Ge-based anode.

Although GeO$_2$/Ge/C has shown interesting reversible performance, the question still remains as to whether or not a bulk Ge electrode can be prepared without arduous efforts to build complicated electrode structure.

SUMMARY

Objects and advantages of the invention will be set forth in part in the following description, or may be obvious from the description, or may be learned through practice of the invention.

Methods are generally provided for forming an electrode. In one embodiment, the method comprises: thermally reducing GeO$_2$ powders at a reducing temperature of 300° C. to 600° C. to produce Ge particles; mixing the Ge particles with an organic binder and a carbon source; and pressing the Ge particles with the binder and the carbon source to form the electrode.

Electrodes are also generally provided that include a plurality of microparticles comprising Ge grains, an organic binder, and a carbon source, wherein the Ge grains comprise cubic Ge and are bonded together to form Ge particles, and wherein the Ge grains define nanopores within the electrode.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying Figures.

DEFINITIONS

Figure 1A:
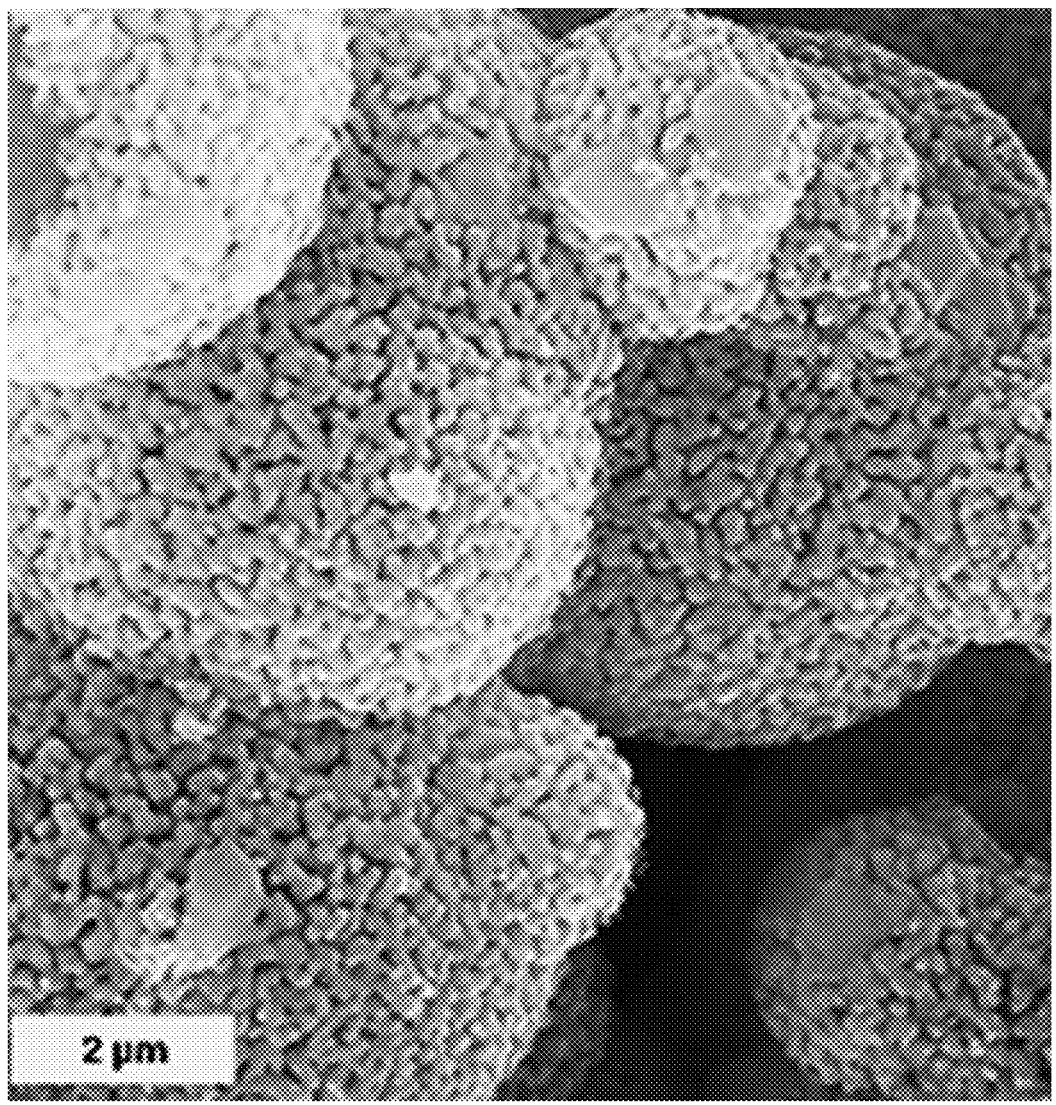
FIG. 1A shows a SEM image of Ge particles reduced at 450° C. with the scale shown at 2 μm.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Generally speaking, the present disclosure is directed to a facile and scalable single-step approach to synthesize bulk germanium electrodes. In one embodiment, the method includes thermally reducing $GeO_2$ powders at a reducing temperature (e.g., from 300° C. to 600° C.) to produce porous Ge particles. In one embodiment, the porous Ge particles have an average size of about 2.5 μm to about 10 μm (e.g., about 5 μm) and are comprised of Ge grains bonded together and defining nanopores within the Ge particles. The Ge grains generally include cubic Ge bonded together to form the grains, and the grains bonded together to form the porous particles. Through one embodiment of the present method, germanium electrodes are formed from nanoscale Ge-grains in about 5 μm porous powders. This three-dimensional Ge electrode exhibits superior specific capacity (e.g., about 1500 mAh/g) and cyclic performance, attributed to its unique lithiation/delithiation processes.

These nanopores and Ge grains assemble to form an ideal electrode structure for lithium ion batteries, which yield high capacity (93% of the theoretical value), high capacity retention (99%) during cycling, and high-rate performance. The presence of a large number of nanopores is vital to achieve a high capacity and capacity retention. The superior electrochemical properties of porous bulk Ge electrodes in our research demonstrate that this type of structure is promising to develop anode materials for different applications, including but not limited to, future electric vehicles.

In most embodiments of the method of forming the electrode, $GeO_2$ powders are first thermally reduced at a reducing temperature of 300° C. to 600° C. to produce Ge particles (e.g., having an average size of about 5 μm). The reducing atmosphere can be generally inert (e.g., comprising hydrogen, consisting essentially of hydrogen, etc.). In one embodiment, the $GeO_2$ powders have an average size of about 100 nm to about 200 nm prior to thermal reduction.

Then, the Ge particles are mixed with an organic binder and a carbon source. The organic binder can include, but is not limited to, alginate, a polyacrylate (e.g., sodium polyacrylate, lithium polyacrylate), a poly(acrylic acid), guar, etc., or mixtures thereof. The carbon source can include, but is not limited to, carbon black (e.g., BP-2000 carbon blacks available from Cabot, Ketjenblack® EC600JD and/or Ketjenblack® EC300JD carbon blacks available from AkzoNobel), acetylene black, etc. or mixtures thereof.

Finally, the Ge particles mixed with the binder and the carbon source are pressed to form the electrode, such as at a pressing pressure of about 10 MPa. In one embodiment, the electrode comprises Ge grains defining nanopores. For example, the Ge grains can have an average size of about 100 nm. In one embodiment, the Ge grains comprise cubic Ge, and are bonded together to form the Ge particles.

In one embodiment, the Ge particles comprise about 80% by weight of the electrode.

Examples

In these Examples, the synthesis, nano/microstructure, and electrochemical property relationships in Ge electrodes are reported. The Ge electrodes were fabricated from a facile and scalable approach.

Figure 1B:
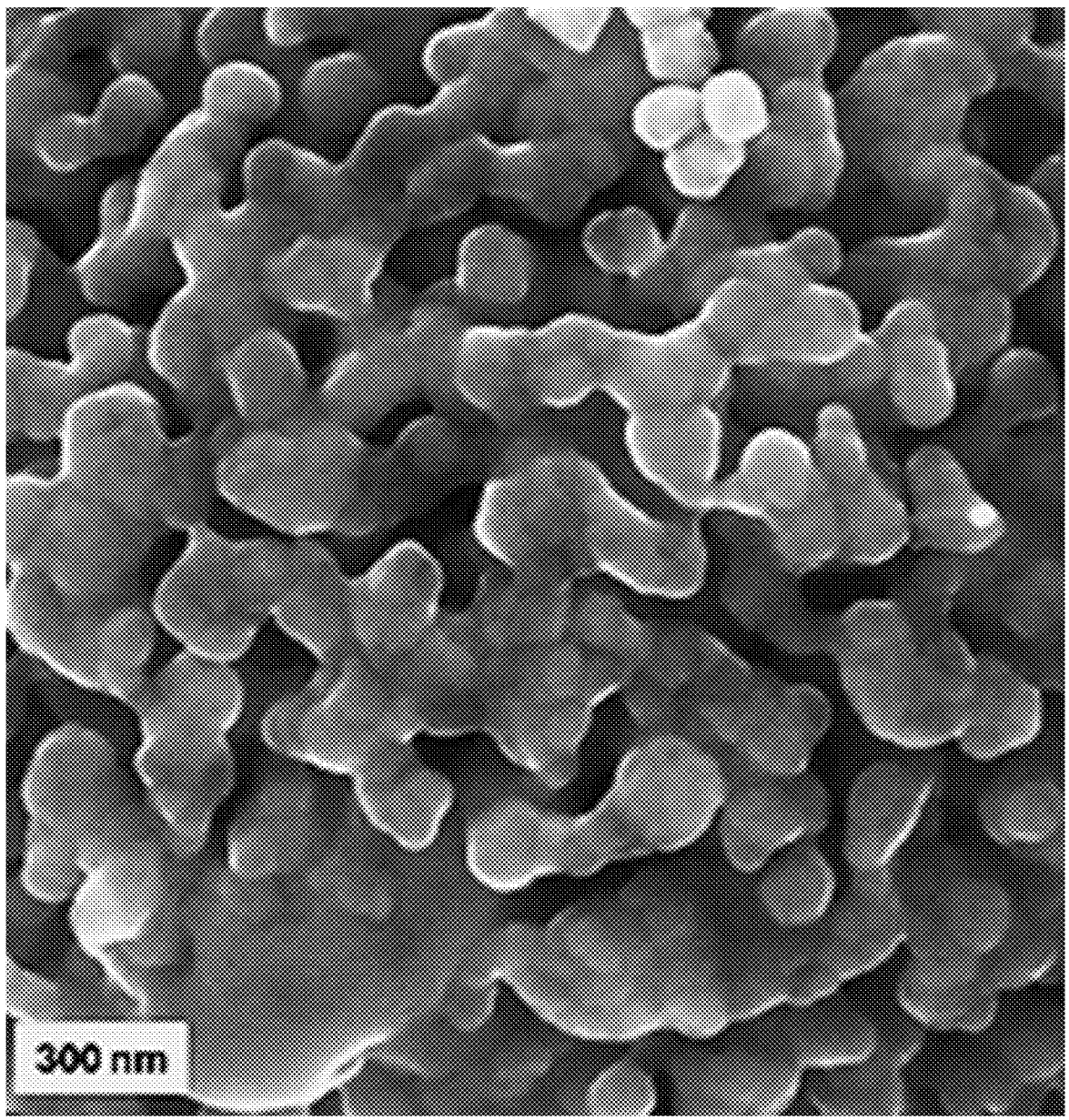
FIG. 1B shows a SEM image of Ge particles reduced at 450° C. with the scale shown at 300 nm.
Figure 1C:
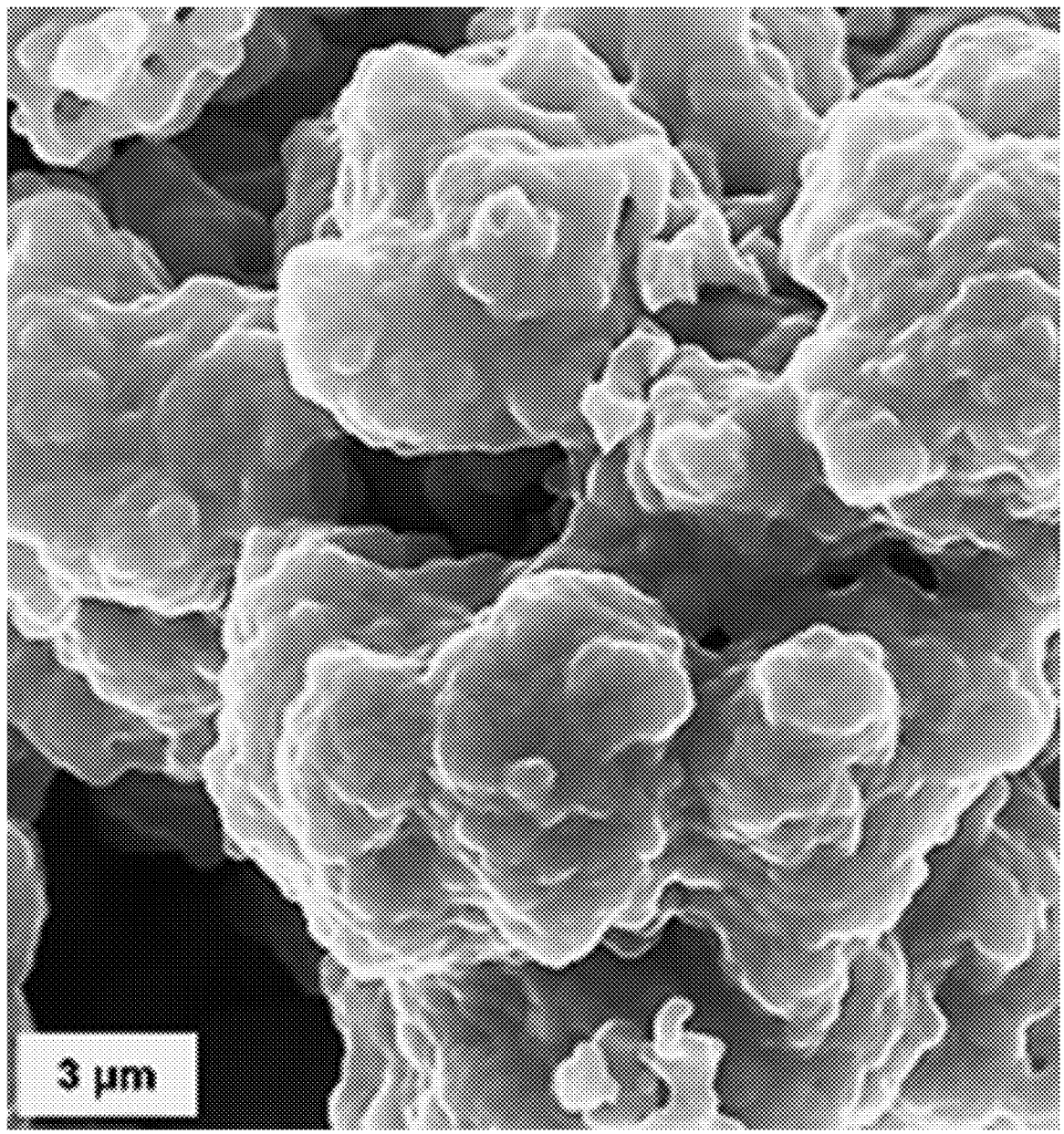
FIG. 1C shows a SEM image of Ge particles reduced at 600° C. with the scale shown at 3 μm.
Figure 1D:
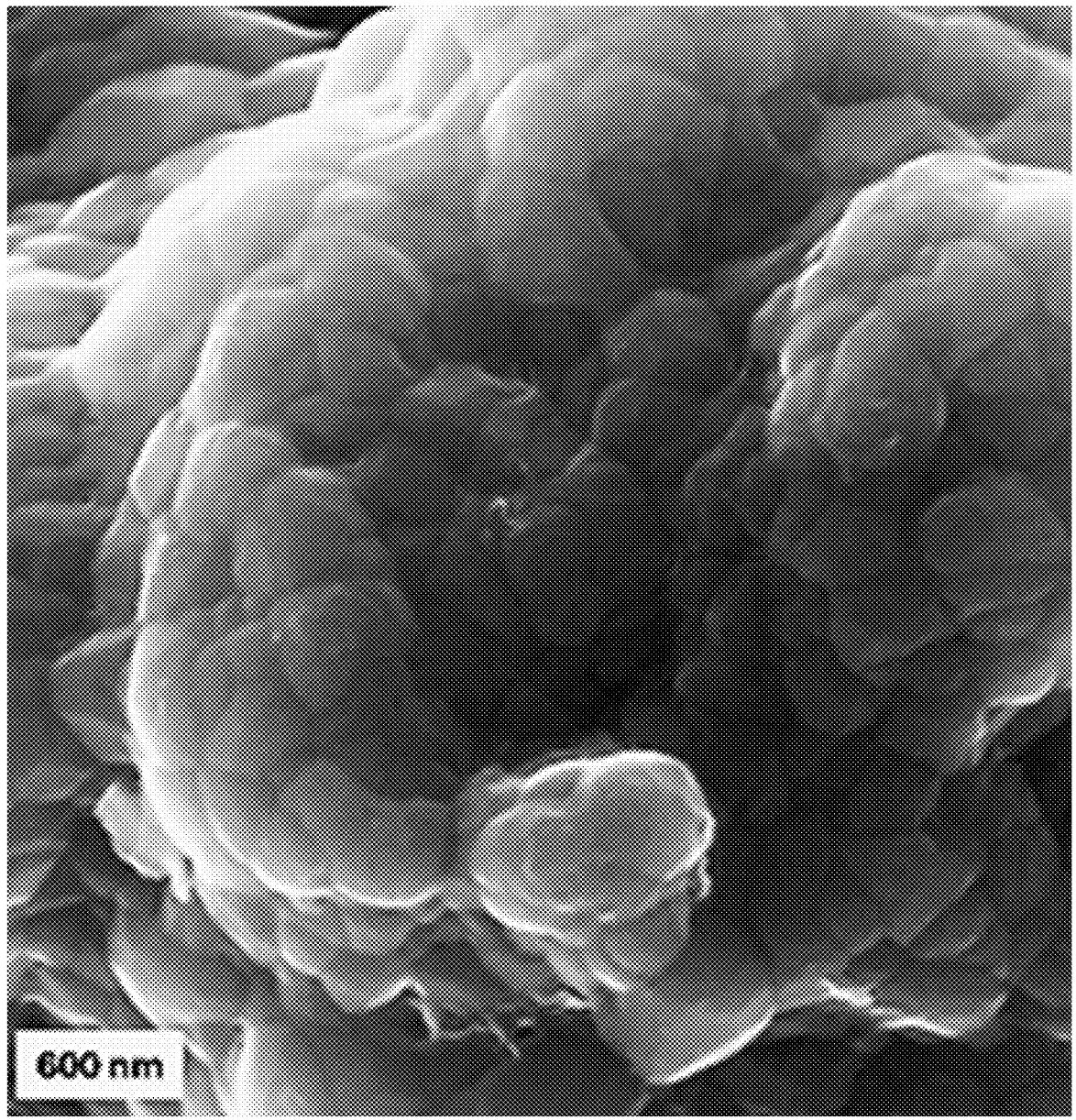
FIG. 1D shows a SEM image of Ge particles reduced at 600° C. with the scale shown at 600 nm.

Initial research focused on the morphological evolution of $GeO_2$ particles as a function of reduction temperature. The morphology of reduced Ge particles was analyzed by using a scanning electron microscopy (SEM). Shown in FIGS. 1A-1D are SEM images of the specimens reduced at 450° C. (FIGS. 1A and 1B) and 600° C. (FIGS. 1C and 1D) for 10 hours. SEM image of initial $GeO_2$, for a comparison, showed that the particles consisted of dense agglomeration of $GeO_2$ grains in the range of about 100 to about 200 nm. Upon reduction, it is known that hexagonal $GeO_2$ (24.75 cm$^3$/mol) undergoes volume shrinkage to form cubic Ge (13.63 cm$^3$/mol). Indeed, porous Ge particles (FIG. 1A) were obtained at 450° C., comprised of about 100 nm Ge grains and a large number of nanosized pores (FIG. 1B). These pores can be filled with the liquid electrolyte to facilitate diffusion of lithium ion, while the size of about 100 nm was reported to be capable of tolerating lithiation/delithiation stress. The as-synthesized nanograins and nanopores are "self"-assembled to micrometer Ge particles, which are ideal for the fabrication of a bulk electrode for lithium ion batteries. On the contrary, reduction at T=600° C. results in not only the elimination of nanopores (FIG. 1C), but also the growth of Ge grains (FIG. 1D), indicating the onset of sintering process at 600° C. for Ge (melting point: 938° C.) that involves densification and grain growth. The structure shown in FIG. 1C is not expected to be favorable for battery electrode. X-ray diffraction measurements showed that $GeO_2$ can be reduced to Ge T 450° C. in the presence of hydrogen.

Figure 2A:
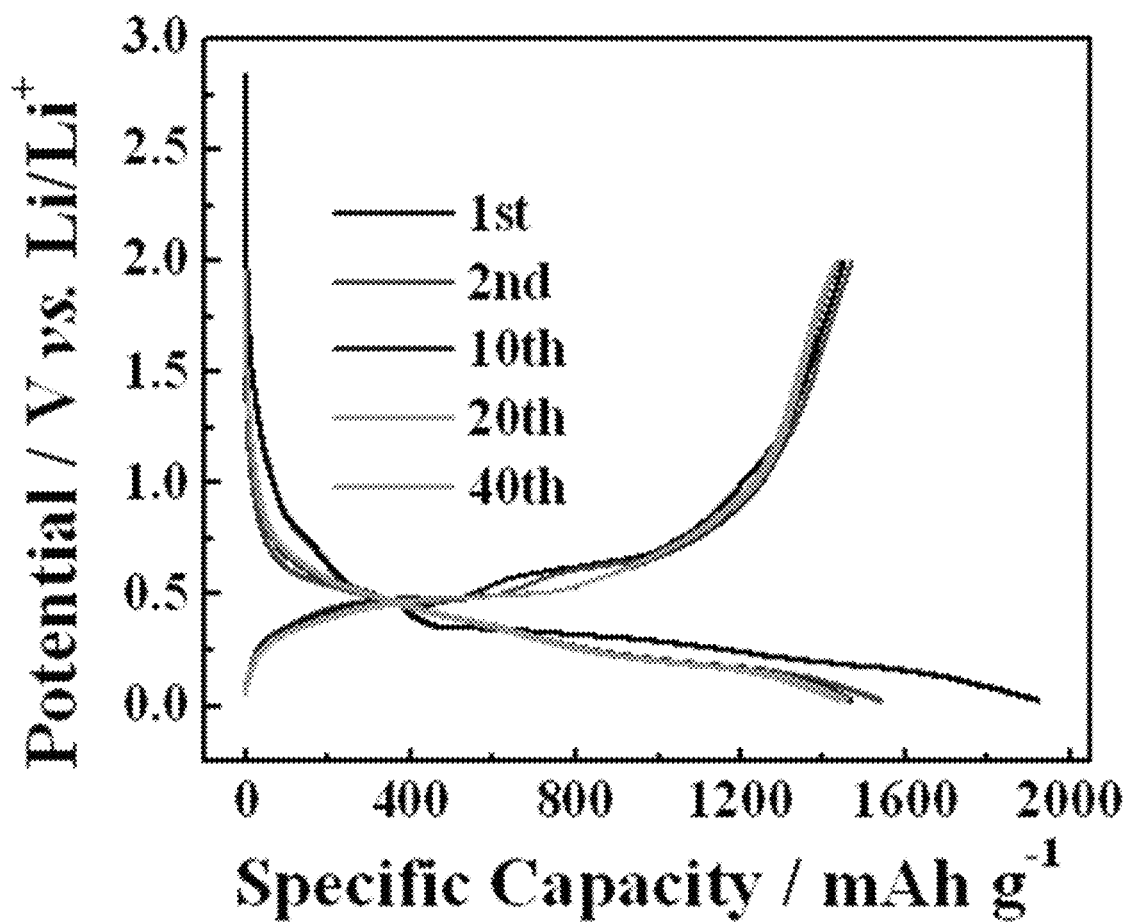
FIG. 2A shows the voltage profile of the bulk Ge electrodes prepared from the thermal reduction of GeO$_2$ at 450° C., according to the Examples.
Figure 2B:
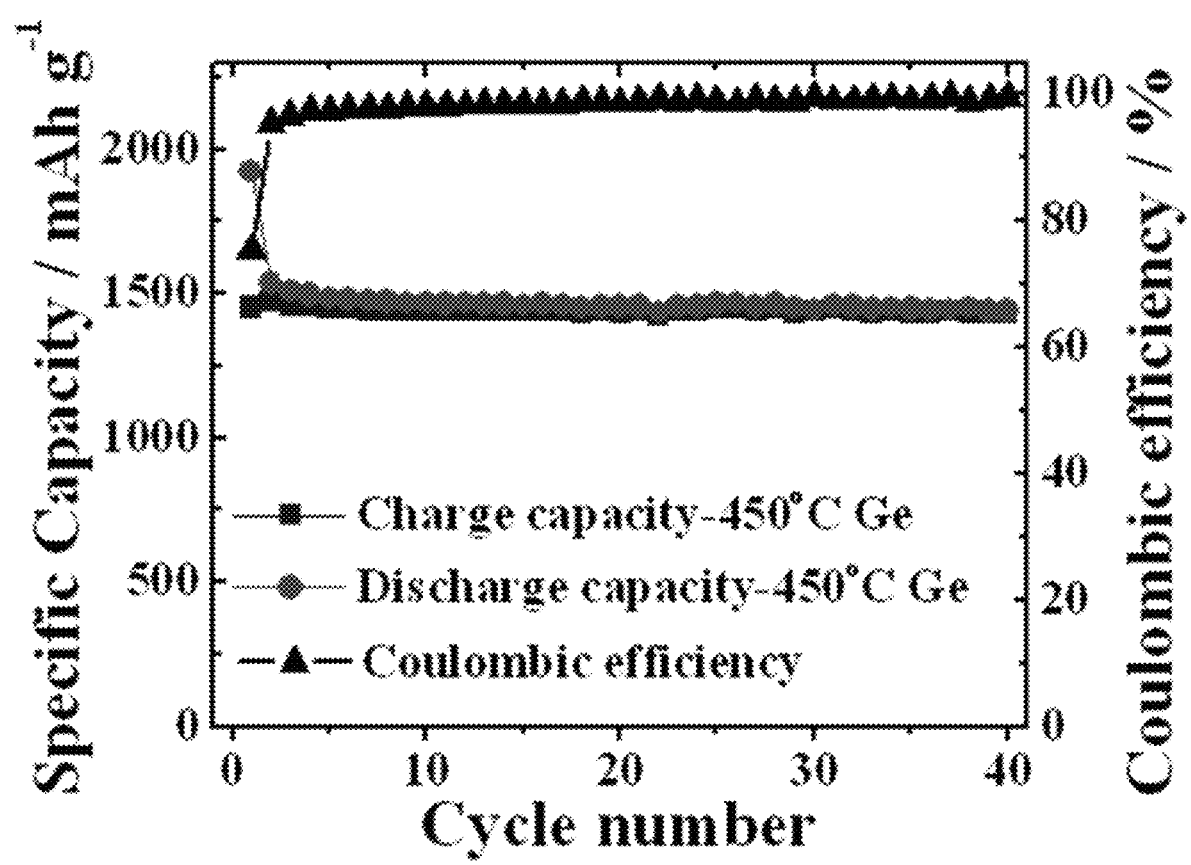
FIG. 2B shows the specific capacity vs. cycle number of the bulk Ge electrodes prepared from the thermal reduction of GeO$_2$ at 450° C., according to the Examples.
Figure 2C:
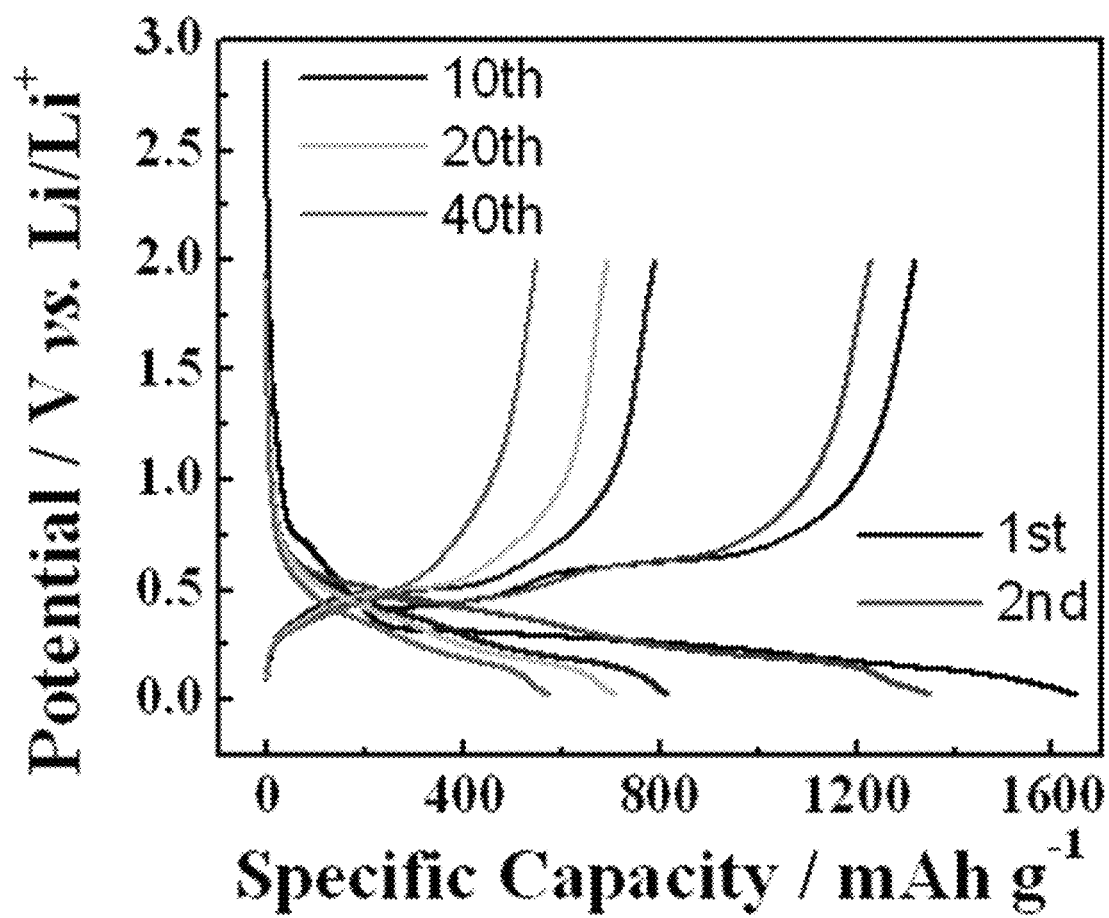
FIG. 2C shows the voltage profile of the bulk Ge electrodes prepared from the thermal reduction of GeO$_2$ at 600° C., according to the Examples.
Figure 2D:
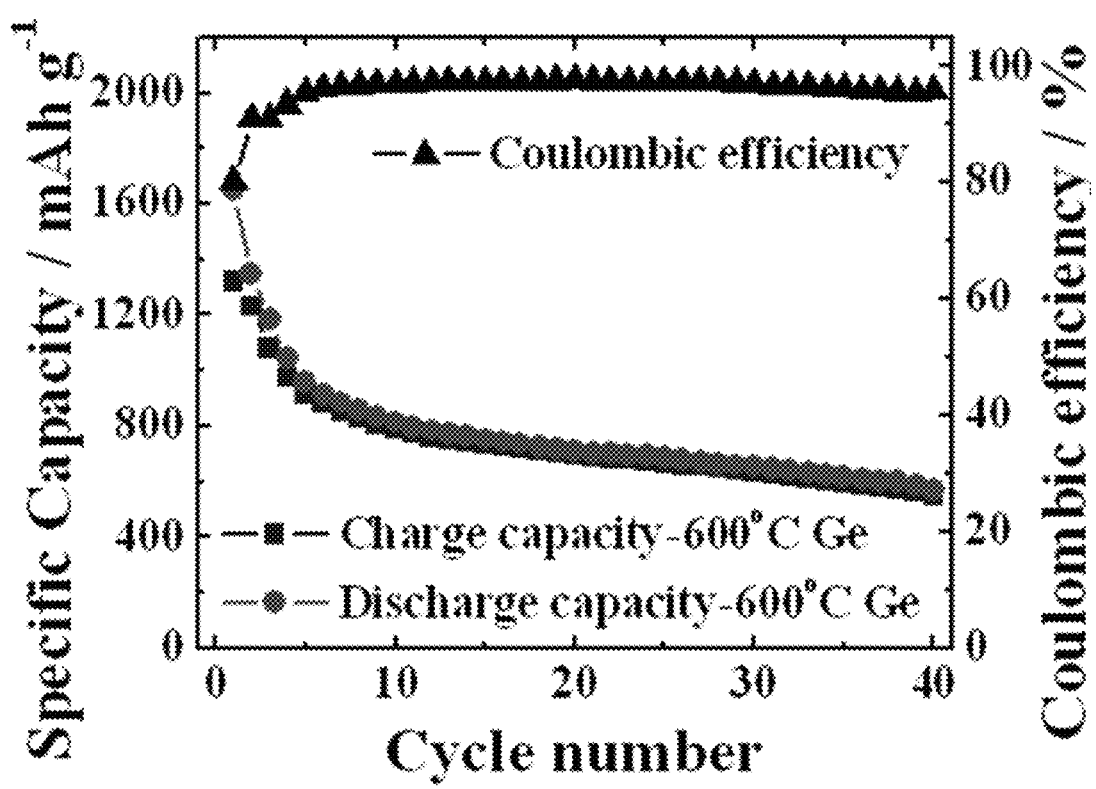
FIG. 2D shows the specific capacity vs. cycle number of the bulk Ge electrodes prepared from the thermal reduction of GeO$_2$ at 600° C., according to the Examples.

Electrochemical measurements were carried out to validate our hypothesis on the aforementioned structure-electrochemical property relationships by employing Ge powders reduced at 450° C. and 600° C. as the anode material. FIG. 2A shows the alloying/dealloying (lithiation/delithiation) voltage profiles for the 1st, 2nd, 10th, 20th and 40th cycles at a constant current density of 50 mA/g. There exist multiple alloying plateaus while a single delithiation plateau at about 0.48 V vs. Li/Li$^+$ overlaps with each other for all cycles (all potentials mentioned hereafter are referred to Li/Li$^+$). The initial alloying and dealloying capacities are about 1920 mAh/g and 1450 mAh/g (FIG. 2B) in Ge electrodes consisting of nanopores (reduction at 450° C.) respectively, yielding an initial Coulombic efficiency of 76%, which are similar to the initial performance of Ge electrode synthesized at 600° C. (FIGS. 2C and 2D).

The reason for which the first alloying capacity is larger than the theoretical capacity of Ge (about 1600 mAh/g) results from the decomposition of the electrolyte and the formation of a solid electrolyte interphase layer, both of which can cause the irreversible capacity visible in the first cycle. Comparing FIGS. 2B and 2D, the electrode consisting of nanopores and fine Ge grains exhibit excellent cyclability. FIG. 2B illustrates that this type of Ge electrode can deliver charge capacity of about 1500 mAh/g up to 40 cycles with a capacity retention of 99%. This performance is much better than that of Ge electrode comprised of dense particles which retains only 42% of its charge over 40 cycles (FIG. 2D). The charge/discharge rate was 50 mA g$^{-1}$ for the data of FIGS. 2A-2D.

Figure 3:
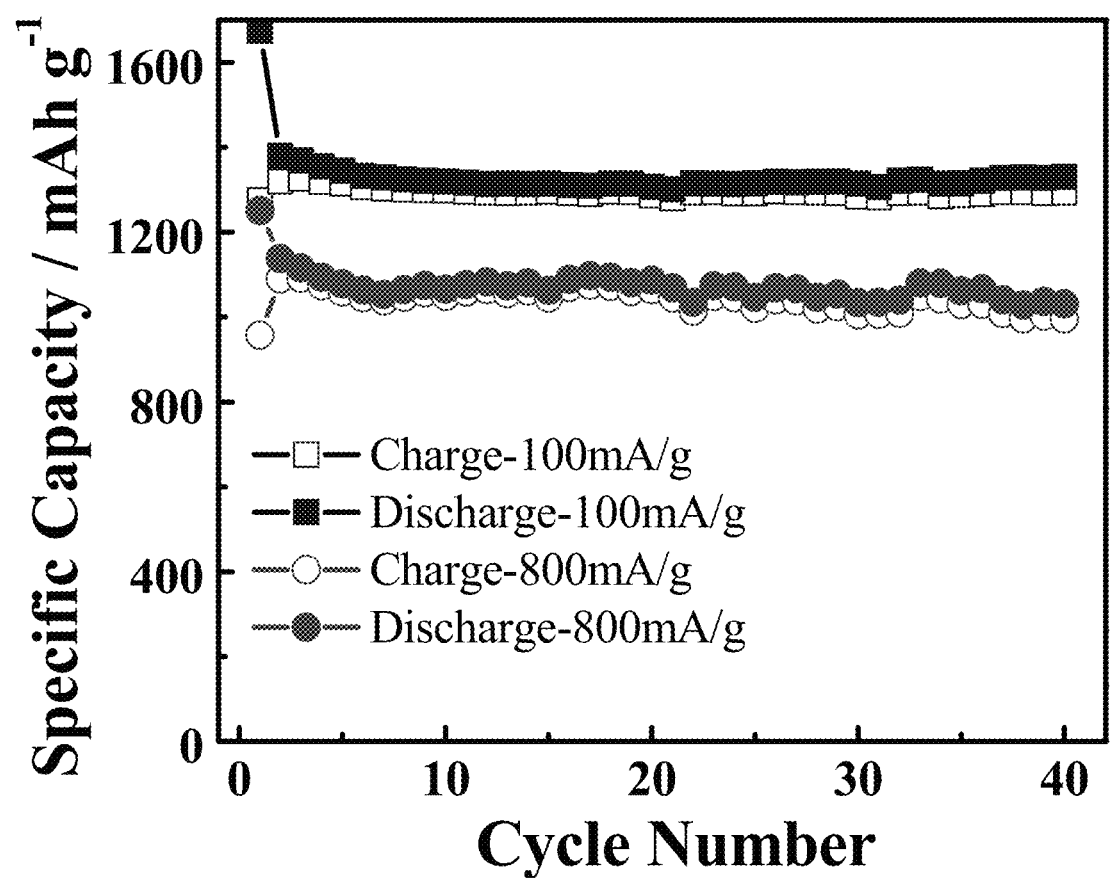
FIG. 3 shows the specific capacity versus cycle number for nano/microstructure Ge electrodes under 100 mA/g and 800 mA/g according to the Examples.

FIG. 3 shows specific capacity vs. cycle number for porous Ge electrode under rates of 100 and 800 mA g-1, which exhibits an alloying capacity of 1300 and 1100 mAh g$^{-1}$, respectively, and the capacity is stable up to 40 cycles.

Figure 4A:
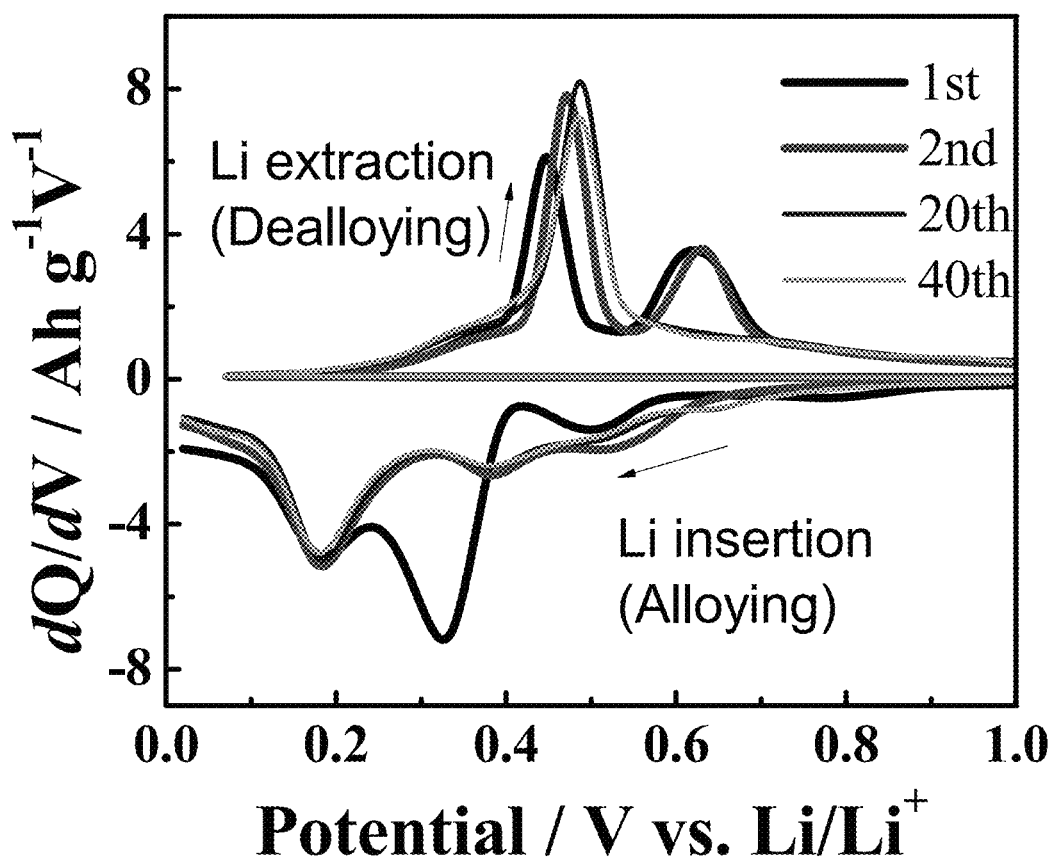
FIG. 4A shows the differential alloying-dealloying capacity curves of the Ge electrode having nanopores (i.e., reduced at 450° C.), according to the Examples.

The differential capacity analysis has long been known for being capable of assessing the mechanisms of the changes in the voltage profile. In differential capacity curves, each peak generally represents a reaction or phase transition in the active material. FIG. 4A shows the differential capacity plots of the 1st, 2nd, 20th and 40th cycles for the electrode. Peaks shown in FIG. 4A are corresponding to the alloying reactions Ge+Li→GeLi$_x$, which occur at 0.20, 0.33 and 0.49 V, and dealloying reactions initially at 0.45 and 0.62 V during initial process (GeLi$_x$ Ge+Li). After several cycles, alloying peaks are centered at 0.20 and 0.40 V, suggesting that porous Ge electrode undergoes a two-step alloying reaction, likely forming Li$_{15}$Ge$_4$ (1384 mAh/g) and Li$_{22}$Ge$_5$ (1620 mAh/g). Unlike Si-based and Sn-based anodes, differential capacity plots for Ge electrodes only exhibit one peak during delithiation, implying this dealloying process, Li$_x$Ge→Ge+xLi is one step, thus in favor of reversibility.

Figure 4B:
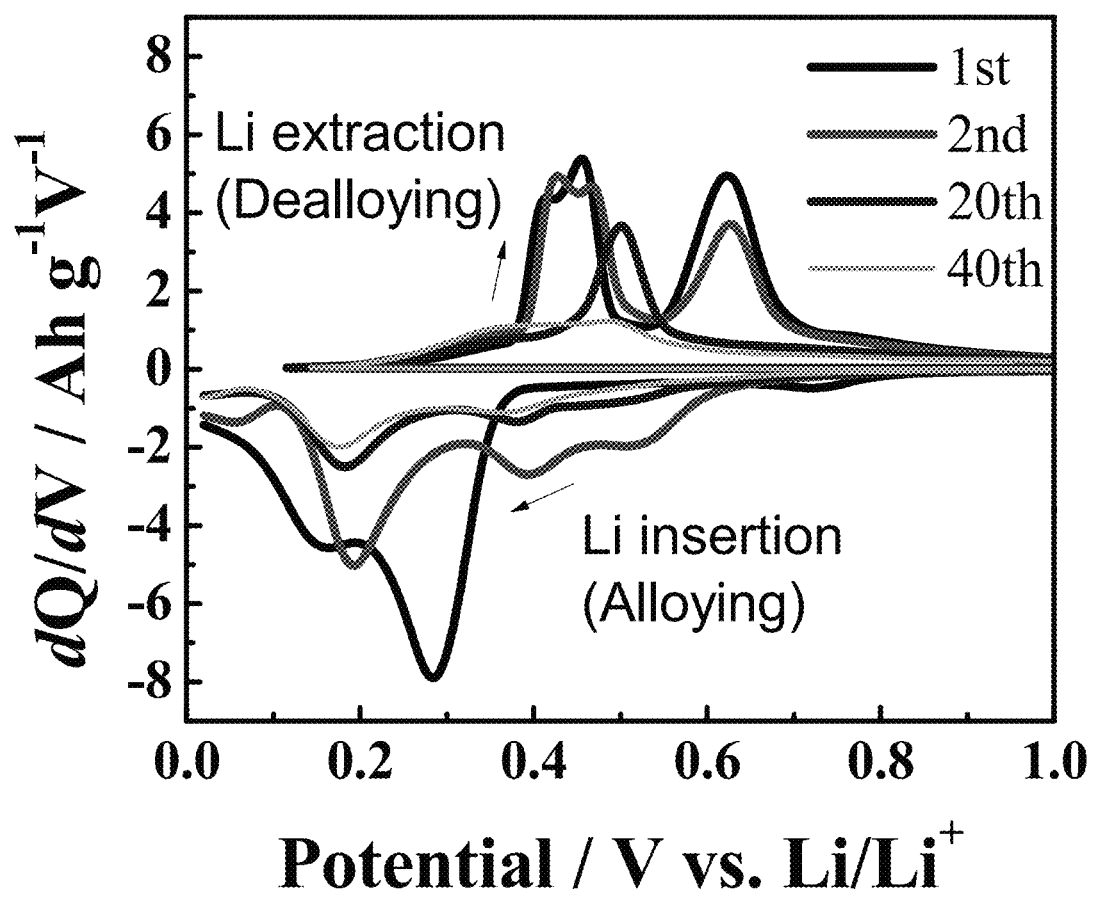
FIG. 4B shows the differential alloying-dealloying capacity curves of the Ge electrode having dense grains (i.e., reduced at 600° C.), according to the Examples.

Recent in-situ TEM studies on the reversible expansion and contraction of Ge electrode revealed that Ge nanoparticles (about 160 nm) were able to sustain large volume changes during cycling. These nanoparticles expanded and shrank instantly in a uniform manner, which was attributed to the isotropic nature of lithiation. In this research, the nanopores, therefore, are pivotal in accommodating isotropic volume expansion during lithiation process. The underlying significance of the presence of nanopores is also shown in FIG. 4B, in which the intensities of the peaks decrease during the cycling process. In the cycling process, a decrease in peak height suggests that the number of available sites to host lithium at these voltages decreases. The heights of the peaks shown in FIG. 4A remain nearly constant, indicating the number of available sites for lithium occupancy is nearly constant. Regarding to lithiation composition, although Liang et al. reported the formation of Li$_{15}$Ge$_4$ (1384 mAh/g) in their studies, it was found that the specific capacity (about 1500 mAh/g) and the existence of two peaks (0.2 and 0.4 V) during lithiation provide evidence of the presence of Li$_{22}$Ge$_5$ (1620 mAh/g) in this research. The stable performance shown in FIG. 2B suggests that Li$_{22}$Ge$_5$ undergoes uniform expansion and contraction during cycling.

In summary, a facile and scalable thermal reduction approach was used to synthesize bulk germanium electrodes, comprised of nanosized pores and Ge-grains in about 5 μm porous powders. These nanopores and Ge grains assemble to form an ideal electrode structure for lithium ion batteries, which yield high capacity (93% of the theoretical value), high capacity retention (99%) during cycling, and high-rate performance. The presence of a large number of nanopores is vital to achieve a high capacity and capacity retention. The superior electrochemical properties of porous bulk Ge electrodes in our research demonstrate that this type of structure is promising to develop anode materials for different applications, including but not limited to, future electric vehicles.

Experimental

Materials preparation: Commercial GeO$_2$ powders were obtained from Alfa Aesar to produce semiconducting Ge. Porous Ge particles were synthesized by a thermal reduction approach in a tube furnace with flowing hydrogen at 300° C. to 600° C. for 10 hours. The pressure of hydrogen was approximately 1 bar.

Materials Characterization: The in-situ X-ray photoelectron spectroscopy (XPS) analysis was carried out with a Kratos AXIS 165 high-performance electron spectrometer. The morphology and phase of the as-synthesized samples were characterized by X-ray diffraction (XRD, Rigaku X-ray diffractometer, Cu-Kα radiation) and scanning electron microscopy (SEM; Carl ZEISS Microscopy).

Electrochemical Measurements: The electrodes were prepared by spreading a mixture of 80 wt % Ge particles (or Ge particles), 10 wt % Na-alginate with medium viscosity as a binder, and 10 wt % Ketjenblack® EC600JD carbon black on to a copper foil. The as-prepared electrodes were dried at 80° C. in a vacuum oven for 12 hours and then pressed under 10 MPa. Electrochemical properties of the electrodes were measured by assembling them into coin cells (type CR2015) in an argon-filled glove box with water and oxygen contents less than 0.1 ppm. The Li metal foil was used as counter electrode and Celgard® 2400 separator as the separator. The electrolyte consisted of a solution of LiPF$_6$ (1 M) in a mixture of ethylene carbonate (EC)/dimethyl carbonate (DMC)/diethyl carbonate (DEC) 1:1:1 (vol %) containing 2 wt % vinylene carbonate (VC). The cells were galvanostatically discharged and charged on a battery test system (Arbin BT2000) between 0.02 and 2.0 V at room temperature.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. An electrode, comprising a plurality of porous microparticles, the porous microparticles having an average size of 2.5 μm to 10 μm, the electrode also including an organic binder and a carbon source, each porous microparticle comprising a plurality of Ge grains bonded to one another, each of the Ge grains comprising cubic Ge, each porous microparticle defining nanopores between individual Ge grains of the plurality of Ge grains.

2. The electrode as in claim 1, wherein the plurality of microparticles have an average size of 5 μm.

3. The electrode as in claim 1, wherein the plurality of Ge grains have an average size of 100 nm.

4. The electrode as in claim 1, wherein the organic binder comprises alginate.

5. The electrode as in claim 1, wherein the organic binder comprises a polyacrylate, a poly(acrylic acid), guar, or mixtures thereof.

6. The electrode as in claim 1, wherein the carbon source comprises carbon black.

7. The electrode as in claim 1, wherein the carbon source comprises acetylene black.

8. The electrode as in claim 1, wherein the electrode comprises 80 wt. % of the Ge particles, 10 wt. % of the organic binder, and 10 wt. % of the carbon source.

9. The electrode as in claim 1, wherein the electrode undergoes a two-step lithium alloying reaction and a one-step lithium dealloying reaction.

10. The electrode as in claim 1, wherein the lithium alloying reaction forms an alloy reaction product comprising $Li_{22}Ge_5$.

11. The electrode as in claim 1, wherein the plurality of porous microparticles and the carbon source are bonded to one another and to a surface of a foil by the binder.

12. A battery comprising the electrode as in claim 1, a separator, and a counter electrode.

13. The battery as in claim 12, comprising a liquid electrolyte within the nanopores.

14. The battery as in claim 12, the counter electrode comprising lithium.

* * * * *